May 22, 1928.

L. M. SPENCER

AUTOMOBILE CURTAIN WINDOW

Filed Feb. 6, 1924

1,670,830

Inventor
Louis M. Spencer
By his Attorneys
Blackmore, Spencer & Hutt

Patented May 22, 1928.

1,670,830

UNITED STATES PATENT OFFICE.

LOUIS M. SPENCER, OF DETROIT, MICHIGAN, ASSIGNOR TO GENERAL MOTORS CORPORATION, OF DETROIT, MICHIGAN, A CORPORATION OF DELAWARE.

AUTOMOBILE CURTAIN WINDOW.

Application filed February 6, 1924. Serial No. 690,933.

The invention has for its object the provision of an inexpensive curtain window, intended chiefly for automobiles, having the following characteristics: (1) a concealed frame covered on the outside by the curtain fabric and on the inside by a fabric lining; (2) a ring exposure on the outside of such nature that the fastening means whereby the ring is secured to the frame is concealed from view from both the outside and the inside; (3) a thoroughly tight seal of such nature that the passage of rain through between the glass and the frame is prevented, thereby avoiding the discoloration of the lining which would otherwise occur; (4) replacement of glass by removal from the inside and without disassembling the ring from the frame; (5) a construction of small cost, both in material and in the operations of assembly. I regard myself as the first to secure these various advantages and characteristics in a single construction.

Other features of the invention will be apparent from the following description of a preferred embodiment of the invention.

Figure 1:
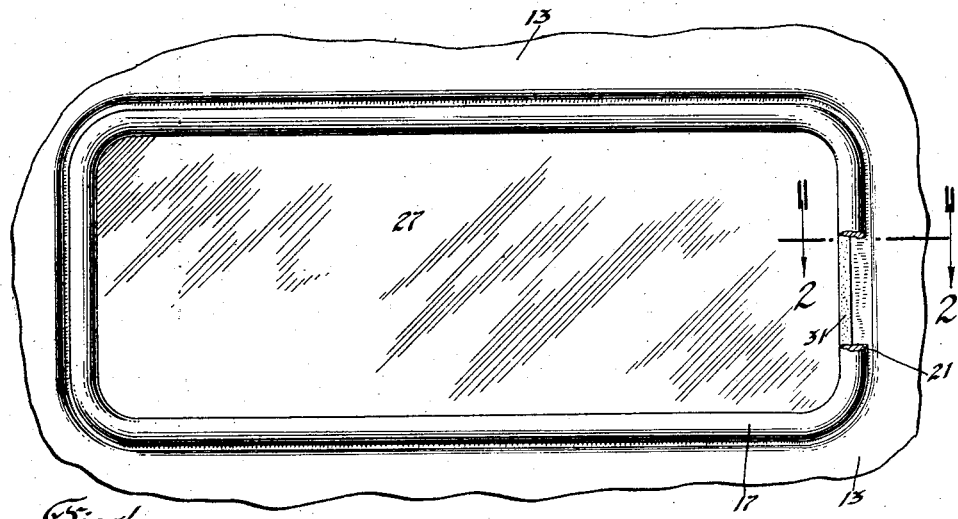
Fig. 1 is a rear elevation of a back curtain light, parts broken away.
Figure 2:
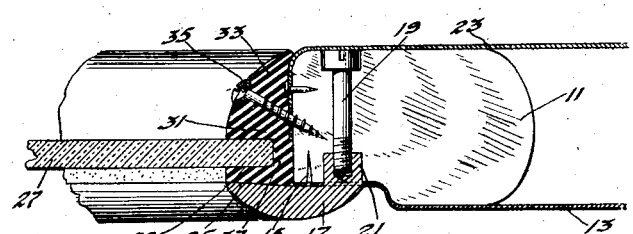
Fig. 2 is a sectional view through a portion of the window taken on line 2—2 of Fig. 1.

In the particular arrangement selected for illustration of the invention, a frame 11 is secured to the outer curtain fabric 13 by fastenings such as tacks 15. A rigid outer ring 17 is attached to the frame by screws 19 extending through the frame, engaging screw threaded apertures in a plurality of embedded bosses 21. The heads of the screws are shown embedded in the frame flush with the inside surface. The inside fabric lining 23 covers the inside surface of the frame and is shown tacked to the inner periphery thereof covering the screw heads.

Figure 3:
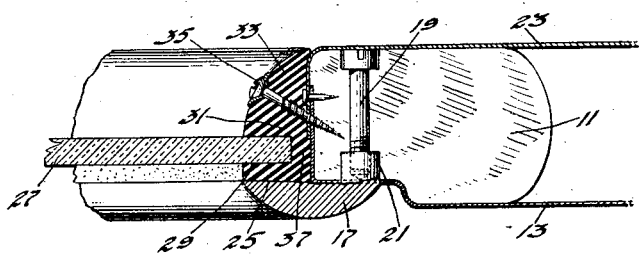
Fig. 3 is a view corresponding to Fig. 2 showing a modified construction.

The rigid outer ring 17 is constructed to extend beyond the inner periphery of the frame and the extended portion is provided with an inwardly inclined face 25 which together with the inner periphery of the frame forms an abutment for a glass retaining member 31, preferably of extruded rubber or equivalent elastic material, overlapping the frame and retaining member. A portion of the outer fabric 13 is covered by the rigid outer ring 17, preferably of metal, pinching it between the frame and ring. The ring could be the only attaching means of the outer fabric to the frame and the tacks 15 could be omitted. A modified form of attaching the fabrics to the frame is shown in Fig. 3. The inside fabric lining 23 overlaps the outside fabric 13, both being secured to the frame 11 by tacks passing through both fabrics.

It is obvious that there may be various ways of constructing the frame and securing it to the curtain fabric, the form illustrated being shown as a practical means for supporting the glass retaining member which together with a glass comprises a unit adapted to be replaced without disturbing any of the above mentioned constructions.

The glass 27 or equivalent transparent element has its outer periphery entering a channel 29 on the inside surface of the member 31. An inwardly extending portion 33 integral with the member 31 carries a plurality of outwardly directed fastenings, shown as screws 35, adapted to extend through the extension 33 and engage the inner periphery of the frame 11. The screws 35 are inclined in such a manner as to draw the retaining member outwardly against the inner periphery of the frame 11 and against the inclined face 25 of the ring 17. It will be understood that by tightening the screws 35 a portion of the retaining member 31 will be pinched between the glass 27 and the inclined face 25 and the portion 37 of the retaining member between the periphery of the glass and frame 11 will be drawn tightly against the inner periphery of the frame forming a tight seal against the penetration of water to the inner lining.

The retaining member not only permits replacement of a broken glass without dismantling the ring from the frame, but also eliminates edge grinding of the glass, as the glass need not be accurately formed in view of its reception in the elastic strip 31.

It will be noted that water falling on the outer face of the glass is prevented by the strip 31 from seeping directly around the edge of the glass to the inside of the car; it is discharged over the outer surface of the ring 17, being prevented from following along the surface 25 by the close contact between the latter and the rubber. The possibility of any seepage to the edge of the fabric 23 and of being drawn into the latter by capillary action is thus avoided.

Other means than that shown may obviously be used to secure the ring 17 to the frame 11.

I claim:

1. In a curtain window, in combination, a frame having an opening therein, a glass, a rubber glass holding member having a channel on its inside surface to embrace the external periphery of said glass, said member constructed and arranged to engage the entire inner periphery of said frame and extending across the edge of the glass between said edge and frame, a rigid outer ring secured to said frame, an inclined surface on said ring extending beyond the inner periphery of said frame, outwardly inclined fastenings carried by said member entering the inner periphery of said frame adapted to draw said member in sealing position against the inner periphery of said frame and against the inclined face of said rigid ring.

2. In a curtain window, in combination, a frame having an opening therein, a rigid outer ring secured to said frame, an inclined surface on said ring extending beyond the inner periphery of said frame, a glass retaining member, a glass carried by said retaining member, and outwardly inclined fastenings for said retaining member adapted to draw said member in sealing position against the inner periphery of said frame and against said inclined face in such a manner as to pinch a portion of said retaining member between the glass and said inclined surface.

In testimony whereof I affix my signature.

LOUIS M. SPENCER.